United States Patent [19]

Lauzon et al.

[11] Patent Number: 5,671,307
[45] Date of Patent: Sep. 23, 1997

[54] USE OF A TEMPERATURE GRADIENT TO IMPOSE A CHIRP ON A FIBRE BRAGG GRATING

[75] Inventors: Jocelyn Lauzon, Saint-Augustin-de-Desmaures, Canada; François Ouellette, Dulwich Hill, Australia

[73] Assignee: Université Laval, Quebec, Canada

[21] Appl. No.: 419,990

[22] Filed: Apr. 10, 1995

[51] Int. Cl.⁶ .................................................. G02B 6/34
[52] U.S. Cl. ........................................ 385/37; 385/10
[58] Field of Search ................ 385/2, 8, 10, 12, 385/37, 40, 123, 124

[56] References Cited

U.S. PATENT DOCUMENTS

| | | | |
|---|---|---|---|
| 5,007,705 | 4/1991 | Morey et al. | 385/12 |
| 5,159,601 | 10/1992 | Huber | 372/6 |
| 5,216,739 | 6/1993 | Hill et al. | 385/123 |
| 5,444,803 | 8/1995 | Kim et al. | 385/37 X |
| 5,459,799 | 10/1995 | Weber | 385/2 |

*Primary Examiner*—Rodney B. Bovernick
*Assistant Examiner*—Hemang Sanghavi
*Attorney, Agent, or Firm*—Christensen O'Connor Johnson & Kindness

[57] ABSTRACT

A linear chirp is imposed on a fibre Bragg grating by means of a temperature gradient impressed on the grating. An optical fibre containing a fibre Bragg grating is set in a groove in an elongated plate. A temperature gradient is imposed on the plate by the applying heat to each end of the plate containing the optical fibre. The heat is applied by means of Peltier effect plates which sandwich each end of the elongated plate. Thermistors are applied to the elongated plate between the Peltier effect plates to provide feedback as to the temperature of the elongated plate and to enable an estimate to be made of the gradient across the fibre Bragg grating.

10 Claims, 2 Drawing Sheets

USE OF A TEMPERATURE GRADIENT TO IMPOSE A CHIRP ON A FIBRE BRAGG GRATING

FIELD OF THE INVENTION

This invention relates to Bragg gratings in optical fibres and, in particular, to apparatus and a method for chirping the grating using a temperature gradient.

BACKGROUND OF THE INVENTION

A fibre Bragg grating is a reflection filter permanently written into the fibre by changing the fibre's refractive index periodically over a certain length. Photo induced externally written fibre Bragg gratings have been known for a number of years. One technique for producing such gratings is the holographic method, discussed in Optics Letters 14(15), 1989 by G. Meltz et al. The method consists of having two ultraviolet beams interfering with one another at the core of an optical fibre. The interference pattern is then photolithographically printed as an index grating in the fibre. The angle between the two interfering ultraviolet beams defines the reflection wavelength of the grating. Another method is the phase mask method, discussed in the Applied Physics Letters 62(10), 1993 by K. O. Hill et al. A phase mask method is an index perturbation written by the diffraction of the +1 and −1 orders interfering with one another in the fibre. The resultant grating has a reflection wavelength which is defined by the period of the phase grating of the mask. Fibre Bragg gratings are considered potentially useful in sensor and communication applications.

A chirp is a longitudinal variation in the grating wave vector. The use of a chirped Bragg grating has been suggested for various applications. Because the grating is dispersive, it should be useful for compensating the dispersion of optical fibre communication links, as suggested in Optics Letters 12(10), 1987 by F. Ouellette. It has also been proposed to use a chirp as a means of broadening the frequency response of the grating in Electronics Letter 30(11), 1994 by M. C. Farries et al. Until very recently, there were no known techniques to fabricate chirped fibre Bragg gratings. Recent suggestions for introducing a chirp on a fibre Bragg grating include: the use of a chirped phase mask (Electronics Letters 30(12), 1994 by R. Kashyap et al.), writing a uniform fibre Bragg grating and then tapering the fibre (Electronics Letters 29(18), 1993 by K. C. Byron et al.), curving the fibre on the phase mask as the grating is being written (Electronics Letters, 30(5), 1994 by K. Sugden et al.), using a half-gaussian intensity shaped ultra violet beam write the grating holographically (Optics Letters 19(12), 1994 by B. J. Eggleton et al.), using a parabolic shaped wave front to write the grating holographically (Electronics Letters 30(11), 1994 by M. C. Farries et al.), and using a strain gradient (Electronics Letters 30(14), 1994 by P. C. Hill et al.). With all of these techniques, the imposed chirp is not tunable and it is difficult to adjust its characteristics accurately.

The present invention allows the imposition of an accurate and tunable chirp on a fibre Bragg grating.

BRIEF DESCRIPTION OF THE INVENTION

In one aspect, the invention is apparatus for imposing a chirp on a fibre Bragg grating comprising an optical fibre containing a fibre Bragg grating and means for applying a temperature gradient to the portion of the optical fibre containing the fibre Bragg grating.

In another aspect, the invention is apparatus for imposing a chirp on a fibre Bragg grating comprising an optical fibre containing a fibre Bragg grating, heat conductive means for holding the fibre in contact with the holding means along the length of the grating, means for applying heat to the holding means adjacent at least one end of the fibre Bragg grating, temperature sensing means for determining the respective temperatures of the fibre at each end, and means for controlling the heat applied by said means for applying heat according to the temperature determined by the sensing means.

BRIEF DESCRIPTION OF THE DRAWINGS

The invention may be more fully appreciated by reference to the detailed description below, in conjunction with the drawings in which.

DETAILED DESCRIPTION OF THE PREFERRED EMBODIMENT

Changing the temperature of a fibre Bragg grating acts on its period via the expansion coefficient $\alpha$ and on its effective index, via the thermal-optic coefficient $\xi$. Knowing that the wave vector of a fibre Bragg grating is at wavelength $\lambda_B = 2\Lambda n$, where $\Lambda$ is the period of the Bragg grating and $n$ is the average effective index of the fibre where the grating stands, we have:

$$\Delta\lambda_B/\Delta T = 2\Lambda n\alpha + 2\Lambda\xi$$

where T is the temperature. As $\alpha$ is of the order of $10^{-6}$ and $\xi$ is of the order of $10^{-5}$ for silica, $\Delta\lambda_B/\Delta T$ is of the order of $10^{-2}$ nm/°C. for grating having $\lambda_B$ around 1550 nm. Since $\lambda_B$ changes proportionally with temperature, a spatial temperature gradient imposes a chirp on the grading which is proportional to the gradient.

Figure 1:
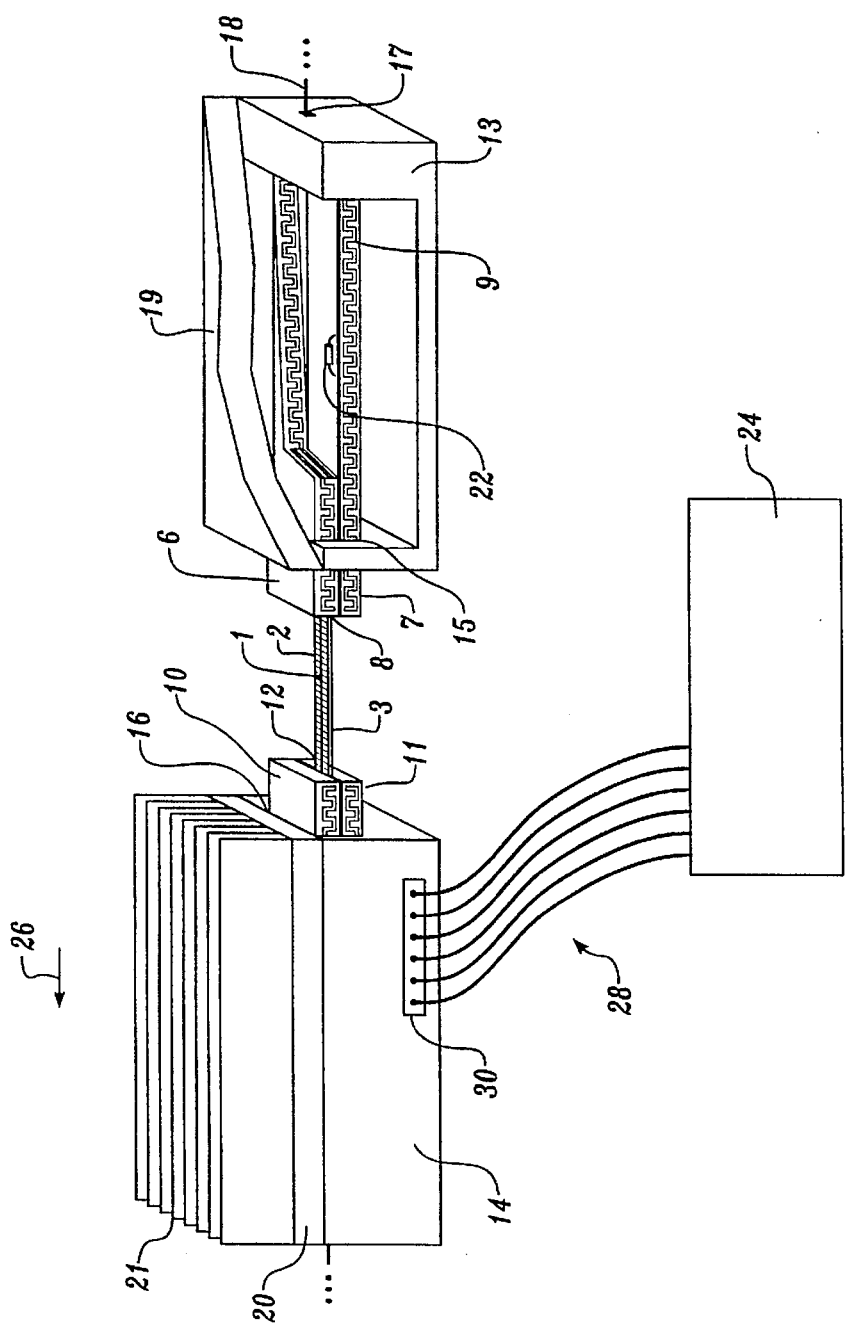
FIG. 1 is a schematic representation of the apparatus according to the preferred embodiment of the invention used to linearly chirp uniformly written fibre Bragg gratings.

A device shown in FIG. 1 was used to impose a chirp on our fibre Bragg gratings.

A length of optical fibre 1 was written with a uniform fibre Bragg grating 2 approximately 1 cm in length.

Figure 2:
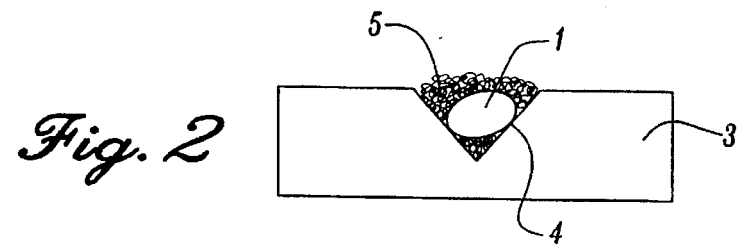
FIG. 2 is a cross-sectional view of an optical fibre set in-a groove in a plate according to the invention.

A thin brass plate 3 approximately 10 cm long was provided with a V-shaped groove 4 about 250 μm deep running along the length of the brass plate. This is best seen in cross sectional view of FIG. 2. The optical fibre 1 was positioned in groove 4. Thermal contact between the optical fibre 1 and the brass plate 3 was assured by a thermal compound 5 (joint compound type 120 from E. G. & G. Wakefield Engineering Inc. of Wakefield, Mass.). The optical fibre 1 was positioned in groove 4 such that the portion of the fibre which was written with the Bragg grating 2 was located at about the mid point of the length of the brass plate 3.

A first pair of Peltier effect plates 6 and 7 were secured in physical contact with the brass plate 3 so that both plates 6 and 7 acted to sandwich one side of the brass plate 3 carrying the optical fibre 1. The Peltier effect plates extended from a point 8 adjacent one end of the Bragg grating to the corresponding end 9 of the brass plate. This resulted in a contact surface just over 4 cm long. However, contact surfaces greater than about 5 mm long are considered to be effective and within the scope of the invention. The Peltier effect plates which were used were CP/0-3/1/-08L from Materials Electronic Products Corporation of Trenton, N.J. The thermal stability of the plates is of the order of 40 m°C. for one hour and the precision of their tunability is better than 10 m°C.

A second pair of Peltier effect plates 10 and 11 were similarly arranged within casing 14 to sandwich the portion of the brass plate 3 carrying the optical fibre 1 adjacent the end 12 of the Bragg grating 2 opposite end 8.

Each pair of Peltier effect plates was secured in a casing (13 and 14) which included slots 15 and 16 through which the Peltier effect plates protruded approximately 0.5 cm. Each casing was further provided with apertures (indicated by the numeral 17 on casing 13) through which the optical fibre was threaded.

Each casing was provided with a cover 19, 20. Cover 20 on casing 14 was also provided with fins 21 to dissipate heat.

Within each casing a thermistor 22 was epoxy glued with thermally conductive epoxy (EPO-TEK 470E, Epoxy Technologies Inc., Billerica, Mass.) onto the brass between the pair of Peltier effect plates, and in close proximity to the optical fibre 1. A small bead thermistor designated N.T.C. 111-103EAJ-H01 from Publicker Industries/Fenwal Electronics Incorporated was used.

The thermistors in each casing were attached by two leads to terminals which were provided on each casing, but which are illustrated for casing 14 only. The terminals were in turn connected by leads to a thermoelectronic control unit 24 (TC-5100 from Seastar Optics Inc. Of Sidney, British Columbia). Each Peltier effect plate was also connected by leads to terminals in the casings and from the terminals to the thermoelectronic control unit 24. A similar arrangement of leads and terminals was provided in each of casings 13 and 14.

OPERATION

The apparatus described above comprises two independent feedback stabilized temperature controllers linked by the thin brass plate bridge. The active elements of the temperature controller are the two pairs of Peltier effect plates. It will be understood that the distance between the two pairs of Peltier effect plates can be adjusted at fabrication to match the length of the written fibre Bragg grating. By using the thermoelectric unit 32 to control the heat generated by each pair of Peltier effect plates, a temperature gradient can be imposed along the brass plate bridging the two pairs of Peltier effect plates in the vicinity of the fibre Bragg grating. The combined effect of Peltier effect Plates 10, 11 and fins 21 is to enable control of both the heat applied to side 26 of the brass plate 3 and the dissipation of heat from that side. The temperature gradient to be produced is selected according to known relationships between the desired chirp characteristics of the optical fibre and the temperature gradient imposed on the Bragg grating. The actual temperature gradient is monitored by feedback from thermistor 22.

In order to assess the accuracy of the gradient predicted from feedback from the thermistors, the actual temperature gradient of the brass plate was monitored by using an infrared camera. The gradient was found not to be perfectly linear but the deviation from linearity was only ±0.25° C. in the worst case scenario of a 40° C. gradient. This was probably due to some convection on the brass plate.

Figure 3:
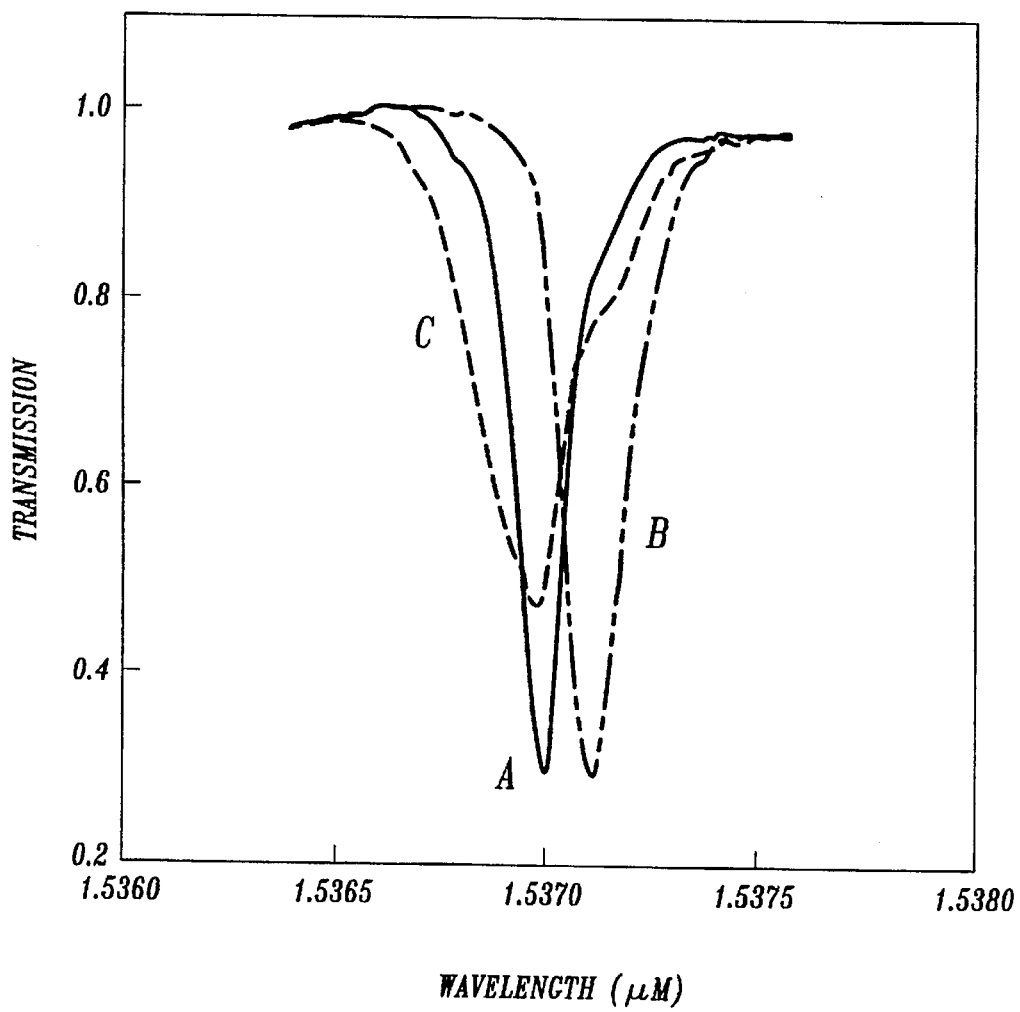
FIG. 3 are graphical representations of the transmission spectrum of a fibre Bragg grating under different chirp conditions. Curve A is the spectrum for a null temperature gradient (FWHM: 0.143 nm), curve B is for a −5.6° temperature gradient (FWHM: 0.170 nm) and Curve C is for a 26.1° C. temperature gradient (FWHM: 0.280 nm).

We have found that the spectral width and peak reflection wavelength of the fibre Bragg grating can be effectively and accurately tuned using the invention, as illustrated in FIG. 3. This is useful in the control of signals emitted by DBR fibre lasers for example. The device is also helpful in characterizing the fibre Bragg grating writing technique. We have also found the mean dispersion associated with our linearly chirped fibre Bragg gratings according to the invention varied with the amplitude of the chirp being imposed on the grating. This suggests that the device might be used as an accurately tunable dispersion compensator for optical fibre communication links.

It will be appreciated that the scope of the invention is not limited to the preferred embodiment described herein. For example, the Peltier effect plates in conjunction with the heat sink consist essentially of temperature controllers for imposing a temperature gradient on a medium containing the optical fibre and the fibre Bragg grating. Other temperature controller means for applying or controlling the heat applied to the fibre containing a fibre Bragg grating so as to produce a temperature gradient would also be within the scope of the invention.

It will also be appreciated that the imposition of a temperature gradient according to the invention may be achieved with a single heat application means (e.g. a pair of Peltier effect plates) at one end only of the fibre containing the fibre Bragg grating, without departing from the scope of the invention. Persons skilled in the art will also appreciate that other modifications to the preferred embodiment may also be practised within the scope of the invention.

What is claimed is:

1. Apparatus for imposing a tunable chirp on a fibre Bragg grating comprising:

an optical fibre having a Bragg grating;

heat conductive means for holding the fibre in contact with the holding means along the length of the grating;

means for selectively applying heat to, and dissipating from, a first localized portion of the holding means adjacent at least one end of the fibre Bragg grating and separate means for selectively applying heat to, and dissipating heat from, a second localized portion of the holding means adjacent an other end of the fibre Bragg grating;

temperature sensing means for determining the longitudinal spatial temperature gradient along the length of the fibre Bragg grating; and, means for selectively controlling the application and dissipation of heat applied to the holding means adjacent each end of the fibre Bragg grating whereby to induce a controllable longitudinal spatial temperature gradient along the length of the grating.

2. Apparatus as in claim 1 wherein temperature sensing means are provided adjacent each end of the fibre Bragg grating.

3. Apparatus in claim 1 wherein the temperature sensing means is an infra red temperature sensor.

4. Apparatus as in claim 1, 2 or 3 wherein the holding means comprises a metal plate.

5. Apparatus as in claim 4 wherein the metal plate has a groove adapted to receive the optical fibre.

6. Apparatus as in claim 1, 2, or 3 wherein the means for selectively applying and dissipating heat is Peltier effect plates sandwiching the holding means adjacent the end of the fibre Bragg grating.

7. Apparatus as in claim 1, 2 or 3 wherein the sensing means is mounted on the holding means in close proximity to the fibre.

8. Apparatus as in claim 7 wherein the sensing means is a thermistor.

9. Apparatus as in claim 1, 2 or 3 wherein the means for controlling the application or dissipation of heat are electronic means including processing means for determining the temperature gradient between said ends according to the temperatures sensed by the sensing means an output means for causing the means for applying or dissipating heat to apply or dissipate heat.

10. Apparatus for imposing a tunable chirp on a fibre Bragg grating comprising:

an optical fibre having a Bragg grating;

heat conductive holding means for holding the fibre in contact with the holding means along the length of the grating;

means for applying heat to a localized portion of the holding means adjacent one end of the fibre Bragg grating;

means for dissipating heat from a localized portion of the holding means adjacent another end of the fibre Bragg grating;

temperature sensing means for determining the respective temperatures of the fibre adjacent each end of the fibre Bragg grating; and, means for selectively controlling the application and dissipation of heat applied to the holding means adjacent said one end of the fibre Bragg grating according to the temperatures determined by the sensing means whereby a controllable spatial temperature gradient along the length of the grating is induced.

* * * * *